United States Patent
Baig et al.

(10) Patent No.: US 9,464,550 B2
(45) Date of Patent: Oct. 11, 2016

(54) SYSTEM AND METHOD FOR RETAINING AFTERTREATMENT BRICKS

(71) Applicant: Caterpillar Inc., Peoria, IL (US)

(72) Inventors: Mirza P. Baig, Peoria, IL (US); Andrew M. Denis, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 784 days.

(21) Appl. No.: 13/724,042

(22) Filed: Dec. 21, 2012

(65) Prior Publication Data

US 2014/0178263 A1 Jun. 26, 2014

(51) Int. Cl.
*B01D 50/00* (2006.01)
*F01N 3/28* (2006.01)
*F01N 3/20* (2006.01)
*F01N 13/18* (2010.01)
*F01N 13/00* (2010.01)

(52) U.S. Cl.
CPC ........... *F01N 3/2803* (2013.01); *F01N 3/2066* (2013.01); *F01N 3/2839* (2013.01); *F01N 13/0093* (2014.06); *F01N 13/0097* (2014.06); *F01N 13/017* (2014.06); *F01N 13/1855* (2013.01); *F01N 2590/10* (2013.01); *Y02T 10/24* (2013.01); *Y10T 29/49815* (2015.01); *Y10T 29/49947* (2015.01)

(58) Field of Classification Search
CPC .............. F01N 3/2803; F01N 3/2839; F01N 13/0097; F01N 2590/10
USPC ................................................. 422/171, 180
See application file for complete search history.

(56) References Cited

U.S. PATENT DOCUMENTS

| | | | |
|---|---|---|---|
| 5,082,479 A | 1/1992 | Miller | |
| 5,169,604 A | 12/1992 | Crothers, Jr. | |
| 5,408,827 A | 4/1995 | Holtermann et al. | |
| 6,660,235 B1 | 12/2003 | Holpp et al. | |
| 7,919,052 B2 | 4/2011 | Ahmed | |
| 7,993,597 B2 | 8/2011 | Kinomoto et al. | |
| 8,062,602 B2 | 11/2011 | Roe et al. | |
| 8,673,043 B2 * | 3/2014 | Merritt | B01D 46/527 422/169 |
| 2004/0031264 A1 * | 2/2004 | Kojima | F01N 3/0222 60/311 |
| 2006/0049006 A1 * | 3/2006 | Hasegawa | F16D 55/224 188/73.1 |
| 2008/0084065 A1 * | 4/2008 | Ogimura | F16L 27/1012 285/369 |
| 2011/0223819 A1 | 9/2011 | Kazuta | |

FOREIGN PATENT DOCUMENTS

| | | |
|---|---|---|
| DE | 2422110 A1 | 11/1975 |
| GB | 1052106 A | 12/1966 |
| GB | 1410134 A | 10/1975 |

\* cited by examiner

*Primary Examiner* — Tom P Duong
(74) *Attorney, Agent, or Firm* — Leydig, Voit & Mayer, Ltd.

(57) ABSTRACT

An aftertreatment system and method treats exhaust gasses produced by an internal combustion process or similar process. The system includes an aftertreatment module having at least one sleeve extending between a first end and a second end. One or more aftertreatment bricks may be axially inserted through an opening disposed in the first end of the sleeve. The aftertreatment brick may include an substrate matrix surrounded by a tubular, protective mantle. To prevent the aftertreatment bricks from unintentionally exiting the sleeve, a retention ring is releasably engaged with the first end of the sleeve. The retention ring may include a dimension that is less than a dimension of the opening in the first end so that at least a portion of the retention ring contacts the mantle of the aftertreatment brick.

7 Claims, 7 Drawing Sheets

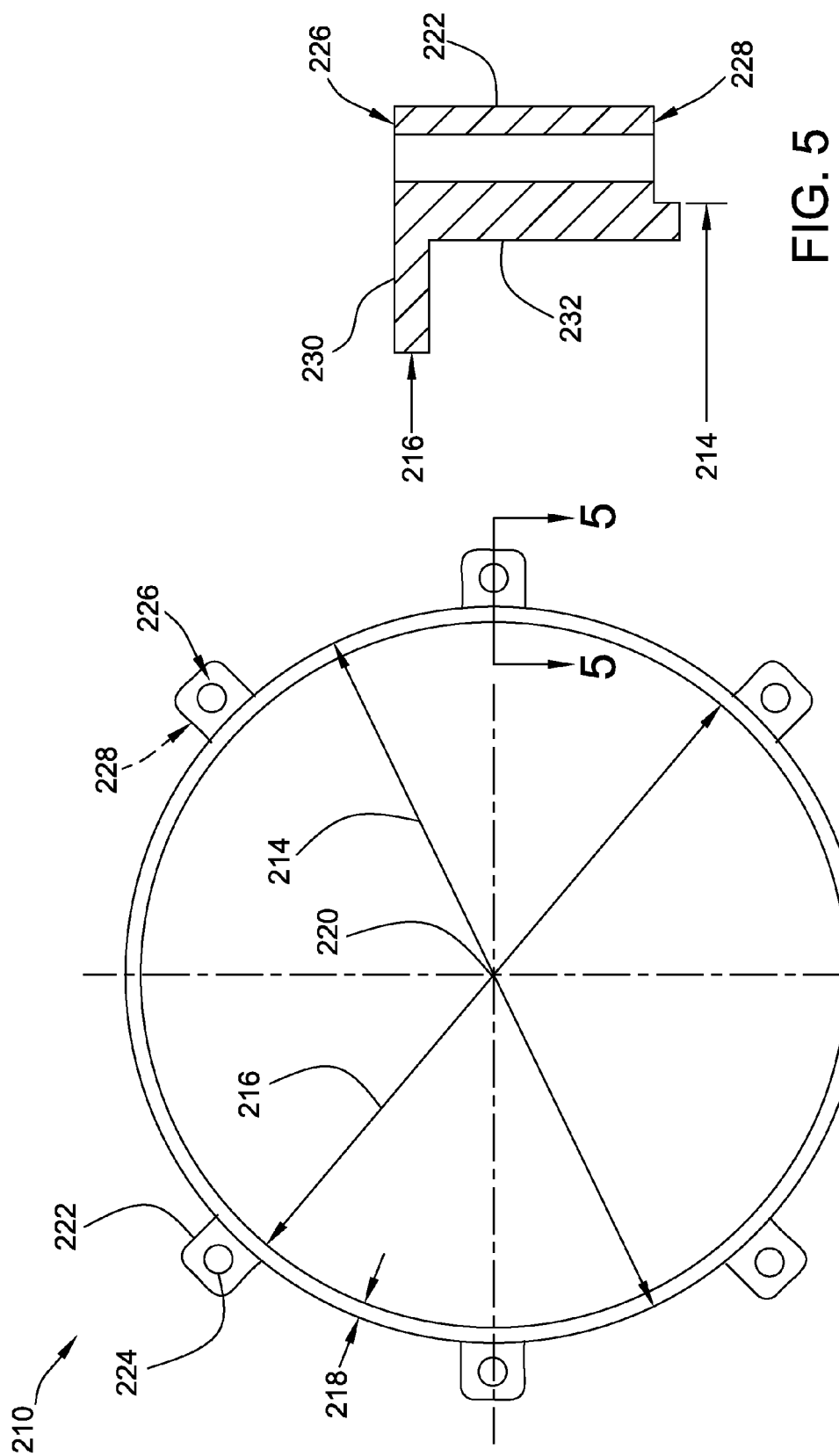

SYSTEM AND METHOD FOR RETAINING AFTERTREATMENT BRICKS

TECHNICAL FIELD

This patent disclosure relates generally to an aftertreatment system for reducing emissions in exhaust gasses from a combustion process and, more particularly, to a method and arrangement for retaining and replacing aftertreatment bricks in such a system.

BACKGROUND

Power systems such as, for example, large internal combustion engines burn hydrocarbon-based fuels or similar fuel sources to convert the chemical energy therein to mechanical energy that can be utilized to power an associated machine or application. Combustion of the hydrocarbon fuel may release or create several byproducts or emissions, such as nitrogen oxides ($NO_X$), carbon monoxides and carbon dioxides (CO and $CO_2$), and particulate matter. The quantity of some of these emissions that may be released to the environment may be subject to government regulations and environmental laws. Accordingly, manufacturers of such power systems may equip the system with an associated aftertreatment system to treat the emissions before they are discharged to the environment.

The aftertreatment system can be disposed in the exhaust channel of the power system and may include a unit or module through which the exhaust gasses may pass. The module may include one or more aftertreatment bricks that can change, chemically or physically, the composition of the exhaust gasses that encounter the bricks. Examples of aftertreatment bricks include catalysts that chemically alter the exhaust gasses and filters that can trap specific components of the exhaust gasses. In some embodiments, the aftertreatment brick may be permanently fixed to the module, for example, by welding or the like. However, some types of aftertreatment bricks may become depleted or deactivated after a period of use, or may become damaged due to the conditions in which they are used, and require replacement. Accordingly, in some aftertreatment systems the aftertreatment bricks may be removable.

An example of a system using removable aftertreatment bricks, in particular catalysts, is described in U.S. Pat. No. 7,919,052 (the '052 patent). The '052 patent describes a housing defining an opening that is part of a flow chamber and a catalyst that is disposed over the opening. To retain the catalyst in place over the opening, a bar is placed across one face of the catalyst perpendicular to the flow chamber. One end of the bar is anchored at the bottom of the flow chamber and the other end is fastened by a bolt-and-nut combination to a front plate at the upper portion of the housing. To remove the catalyst, the bar must be both unbolted from the housing and unanchored from the bottom of the flow channel. Moreover, the bolt-and-nut combination and the anchor may be oriented in different directions, complicating removal of the bar to access the catalyst.

SUMMARY

The disclosure describes, in one aspect, an aftertreatment module including a sleeve extending between an first end and an opposing second end along a sleeve axis. Disposed at the first end of the sleeve is an opening. One or more aftertreatment bricks may be inserted in the sleeve through the opening. The aftertreatment bricks can include a substrate matrix and a mantle disposed around the substrate matrix. To retain the aftertreatment bricks in the sleeve, a retention ring having a width dimension that is less than a width dimension associated with the opening of the sleeve is engaged to the sleeve so as to be in abutting contact with the mantle.

In another aspect, the disclosure describes a method of servicing an aftertreatment module. The aftertreatment module can include a sleeve extending between an first end and a second end along a sleeve axis. The sleeve may further include an axially aligned opening at the first end. An aftertreatment brick is axially inserted into the opening of the sleeve. The aftertreatment brick includes a substrate matrix and a mantle disposed around the substrate matrix. According to the method, a retention ring is releasably engaged to the first end of the sleeve so that the retention ring is in abutting contact with the mantle. Per the method, the aftertreatment brick may also be retrieved from the sleeve by disengaging the retention ring and removing the aftertreatment brick axially through the opening of the sleeve.

In yet another aspect, the disclosure describes a method of retaining an aftertreatment brick in an aftertreatment module. The method includes inserting an aftertreatment brick through an opening in a sleeve disposed in the aftertreatment module. The method further involves engaging a retention ring to the sleeve so that a portion of the ring abuts the aftertreatment brick. The retaining ring is then releasable fastened to aftertreatment module.

BRIEF DESCRIPTION OF THE DRAWINGS

FIG. 4 is an elevational view of the retention ring including the relative dimensions of its inner and outer diameters.

FIG. 5 is an enlarged cross-sectional view of the retention ring taken along line 5-5 of FIG. 4.

DETAILED DESCRIPTION

Figure 1:
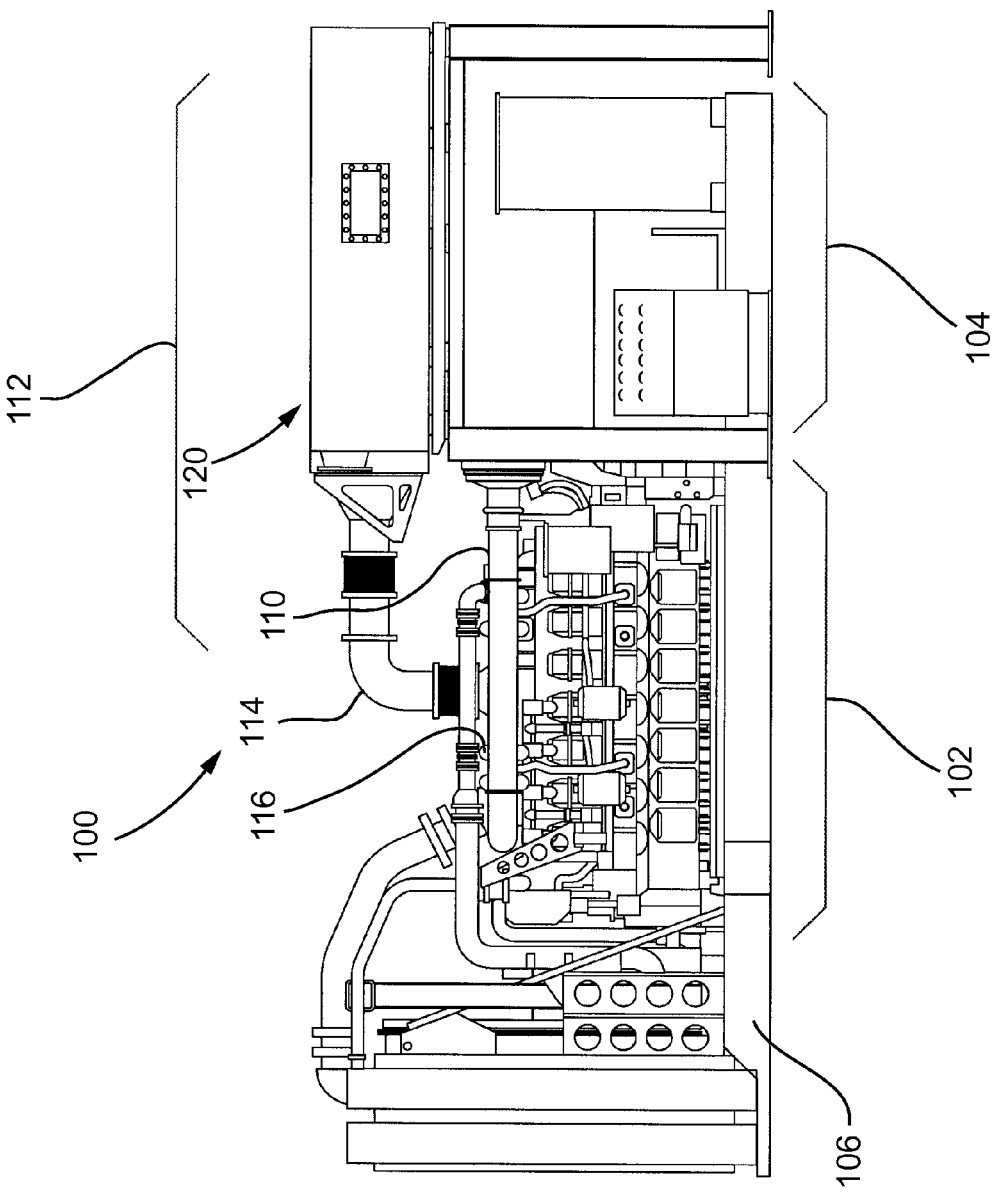
FIG. 1 is a side elevational view of a power system including an internal combustion engine coupled to a generator and associated with an aftertreatment module.

This disclosure relates generally to an exhaust aftertreatment system that may be associated with a power system producing exhaust gasses and, more particularly, relates to aftertreatment bricks that may be a removable component of such aftertreatment systems. Now referring to the drawings, wherein like reference numbers refer to like elements, there is illustrated in FIG. 1 an example of a power system 100 that can generate power by combusting fossil fuels or the like. The illustrated power system 100 can include an internal combustion engine 102 such as a diesel engine operatively coupled to a generator 104 for producing electricity. The internal combustion engine 102 may have any number of cylinders as may be appreciated by one of ordinary skill in the art. The internal combustion engine 102 and the generator 104 can be supported on a common mounting frame 106. The power system 100 can provide on-site stand-by power or continuous electrical power at locations where access to an electrical grid is limited or unavailable. Accordingly, the generator 104 and internal combustion engine 102 can be scaled or sized to provide suitable wattage and horsepower. It should be appreciated that in other embodiments, the power system of the present disclosure can be utilized in other applications such as gasoline burning engines, natural gas turbines, and coal burning systems. Further, in addition to stationary applications, the present disclosure can be utilized in mobile applications such as locomotives and marine engines.

To direct intake air into and exhaust gasses from the power system 100, the power system can include an air introduction system 110 and an exhaust system 112. The air introduction system 110 introduces air or an air/fuel mixture to the combustion chambers of the internal combustion engine 102 for combustion while the exhaust system 112 includes an exhaust pipe or exhaust channel 114 in fluid communication with the combustion chambers to direct the exhaust gasses produced by the combustion process to the environment. To pressurize intake air by utilizing the positive pressure of the expelled exhaust gasses, the power system 100 can include one or more turbochargers 116 operatively associated with the air introduction system 110 and the exhaust system 112.

The exhaust system 112 can include components to condition or treat the exhaust gasses before they are discharged to the environment. For example, an exhaust aftertreatment system 120 in the form of a clean emissions module (CEM) can be disposed in fluid communication with the exhaust system 112 downstream of the turbochargers 116 to receive the exhaust gasses discharged from the internal combustion engine 102. The term "aftertreatment" refers to the fact that the system treats exhaust gasses after they have been produced and is therefore distinguishable from fuel additives and the like that affect the combustion process. The aftertreatment system 120 can be designed as a separate unit that can be mounted to the power system 100 generally over the generator 104, for example, and can receive exhaust gasses from the exhaust channel 114. By manufacturing the aftertreatment system 120 as a separate modular unit, the design can be utilized with different sizes and configurations of the power system 100. However, in other embodiments, the aftertreatment system 120 can be integral with the power system 100 and can be disposed at other locations rather than above the power system. The aftertreatment system 120 can be configured to treat, remove or convert regulated emissions and other constituents in the exhaust gasses.

Figure 2:
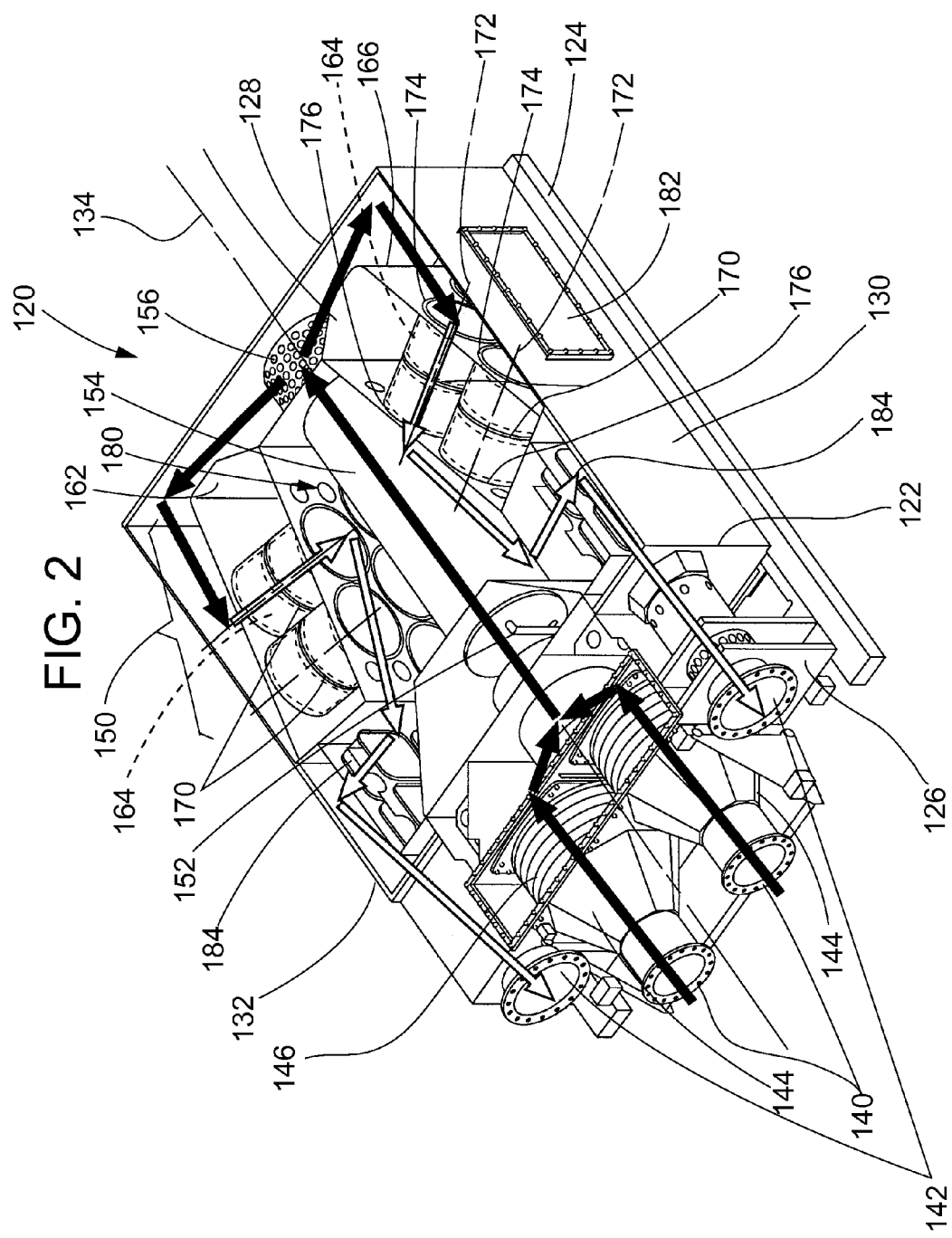
FIG. 2 is a perspective view of the clean emissions module with the top removed to illustrate the components inside of, and exhaust flow through, the module.

Referring to FIG. 2, the aftertreatment system 120 can include a box-like housing 122 that is supported on a base support 124 adapted to mount the aftertreatment system to the power system. The box-like housing 122 can include a forward-directed first wall 126, an opposing rearward second wall 128, and respective third and fourth sidewalls 130, 132. However, it should be appreciated that terms like forward, rearward and side are used only for orientation purposes and should not be construed as a limitation on the claims. Additionally, extending between the forward first wall 126 and rearward second wall 128 and located midway between the third and fourth sidewalls 130, 132 can be an imaginary central system axis line 134. The housing 122 may be made from welded steel plates or sheet material.

To receive the untreated exhaust gasses into the aftertreatment system 120, one or more inlets 140 can be disposed through the first wall 126 of the housing 122 and can be coupled in fluid communication to the exhaust channel from the exhaust system. In the embodiment illustrated, the aftertreatment system 120 includes two inlets 140 arranged generally in parallel and centrally located between the third and fourth sidewalls 130, 132 on either side of the system axis line 134 so that the entering exhaust gasses are directed toward the rearward second wall 128. However, other embodiments of the aftertreatment system 120 may include different numbers and/or locations for the inlets. To enable the exhaust gasses to exit the aftertreatment system 120, two outlets 142 can also be disposed through the first wall 126 of the housing 122. Each outlet 142 can be parallel to the centrally oriented inlets 140 and can be disposed toward one of the respective third and fourth sidewalls 130, 132.

To treat or condition the exhaust gasses, the housing 122 can contain various types or kinds of exhaust treatment devices through or past which the exhaust gasses are directed. For example and following the arrows indicating exhaust flow through the aftertreatment system 120, in order to slow the velocity of the incoming exhaust gasses for treatment, the inlets 140 can each be communicatively associated with an expanding, cone-shaped diffuser 144 mounted exteriorly of the front first wall 126. Each diffuser 144 can direct the exhaust gasses to an associated diesel oxidation catalyst (DOC) 146 located proximate the first wall 126 inside the housing 122 that then directs the exhaust gasses to a common collector duct 148 centrally aligned along the system axis line 134. The DOC 146 can contain materials such as platinum group metals like platinum or palladium which can catalyze carbon monoxide and hydrocarbons in the exhaust gasses to water and carbon dioxide via the following possible reactions:

$$CO + \tfrac{1}{2}O_2 = CO_2 \tag{1}$$

$$[HC] + O_2 = CO_2 + H_2O \tag{2}$$

To further reduce emissions in the exhaust gasses and, particularly, to reduce nitrogen oxides such as NO and $NO_2$, sometimes referred to as $NO_X$, the aftertreatment system may include an SCR system 150. In the SCR process, a liquid or gaseous reductant agent is introduced to the exhaust system and directed through an SCR catalyst along with the exhaust gasses. The SCR catalyst can include materials that cause the exhaust gasses to react with the reductant agent to convert the $NO_X$ to nitrogen ($N_2$) and water ($H_2O$). A common reductant agent is urea ($(NH_2)_2CO$), though other suitable substances such as ammonia ($NH_3$) can be used in the SCR process. The reaction may occur according to the following general formula:

$$NH_3 + NO_X = N_2 + H_2O \tag{3}$$

Referring to FIG. 2, to introduce the reductant agent, the SCR system 150 includes a reductant injector 152 located downstream of the collector duct 148 and upstream of a centrally aligned mixing duct 154 that channels the exhaust gasses toward the rearward second wall 128 of the housing 122. The reductant injector 152 can be in fluid communication with a storage tank or reservoir storing the reductant agent and can periodically, or continuously, inject a measure of the reductant agent into the exhaust gas stream in a process sometimes referred to as dosing. The amount of reductant agent introduced can be dependent upon the $NO_X$ load of the exhaust gasses. The elongated mixing duct 154 uniformly intermixes the reductant agent with the exhaust gasses before they enter the downstream SCR catalysts. Disposed at the end of the mixing duct 154 proximate the second wall 128 can be a diffuser 156 that redirects the exhaust gas/reductant agent mixture toward the third and fourth sidewalls 130, 132 of the aftertreatment system 120. The third and fourth sidewalls 130, 132 can redirect the exhaust gas/reductant agent mixture generally back towards the front first wall 126.

Figure 3:
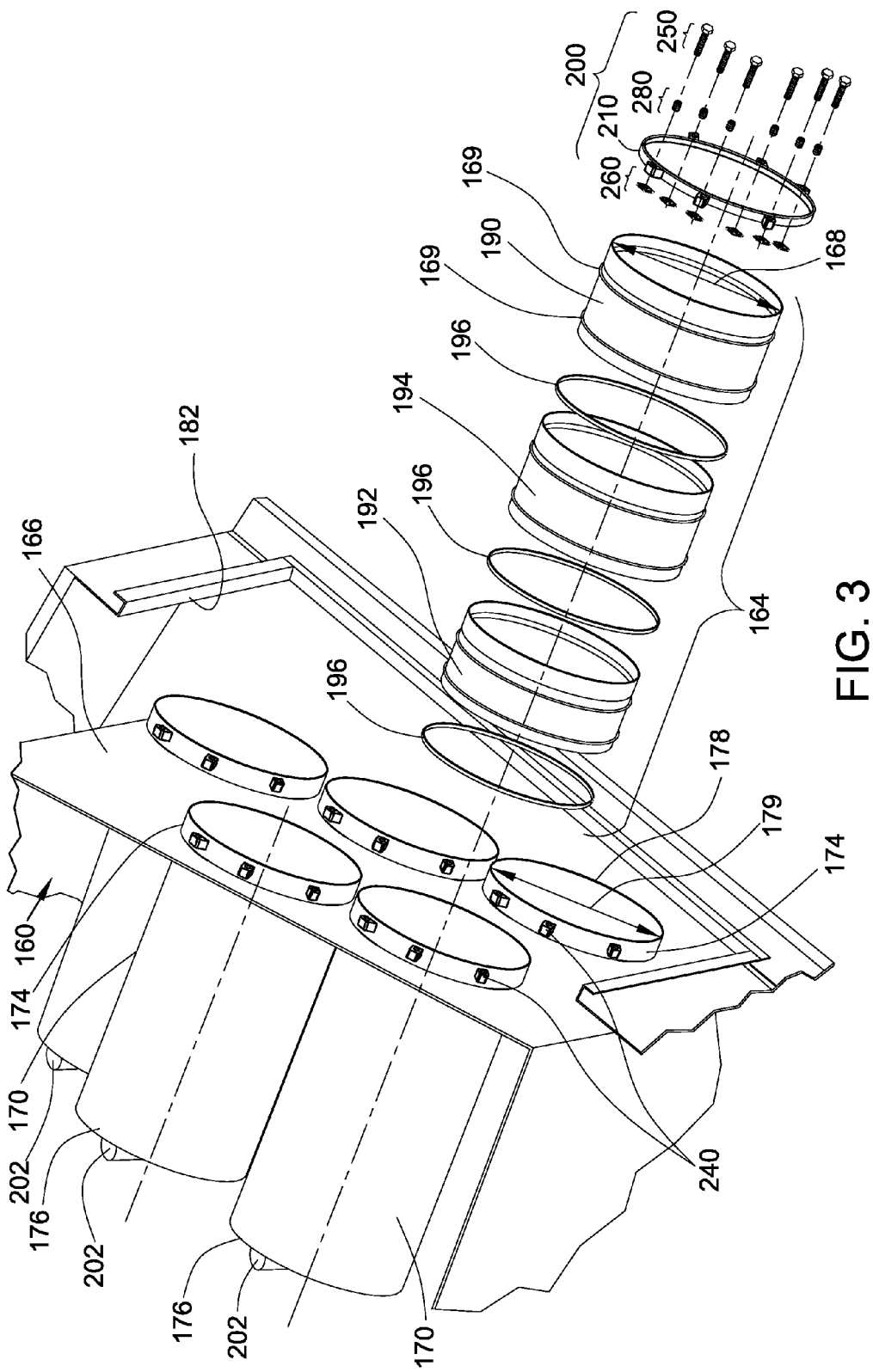
FIG. 3 is a perspective view of an aftertreatment module disposed in the clean emissions module, the aftertreatment module including at least one sleeve receiving a plurality of aftertreatment bricks and a retention ring for engaging the sleeve to retain the aftertreatment bricks.

To perform the SCR reaction process, the aftertreatment system 120 can include a first SCR module 160 disposed proximate the third sidewall 130 and a second SCR module 162 disposed toward the fourth sidewall 132. The first and second SCR modules 160, 162 are oriented to receive the redirected exhaust gas/reductant agent mixture. Referring to FIGS. 2 and 3, the first and second SCR modules 160, 162 include a support structure or frame 166 that can accommodate one or more SCR catalysts 164 (of which only mantles but not substrates appear in FIG. 3), sometimes referred to as aftertreatment bricks. The term aftertreatment brick, however, may refer to a variety of exhaust aftertreatment devices which SCR catalysts are a subset of. Accordingly, in other embodiments, different types of aftertreatment bricks operating by different reaction processes may be substituted in the first and second SCR modules 160, 162. Further, although the illustrated plurality of SCR catalysts 164 are generally cylindrical and have an outer catalyst diameter 168, the SCR modules 160, 162 may be configured to accommodate aftertreatment bricks of different shapes, sizes and/or configurations. Accordingly, the described embodiments of aftertreatment bricks are by way of example only and should not be construed as limitations on the claims unless clearly stated otherwise.

To hold the plurality of SCR catalysts 164, the SCR modules 160, 162 can include one or more sleeves 170 that can slidably receive the catalysts. The sleeves 170 can be generally elongated, hollow tubular structures having a first end 174 and an opposing second end 176 aligned along a longitudinal sleeve axis 172. In some embodiments, the first end 174 can be designated an upstream end and the second end 176 can be designated a downstream end thereby gas flow through the sleeve 170. In other embodiments, the system may be at least partially reversible so that either of the first and second ends may act as an upstream or downstream end. In those embodiments that include more than one sleeve 170 in the first and second SCR modules 160, 162, the sleeves can be supported in the truss-like frame 166 made, for example, from formed sheet metal or cast materials. The frame 166 can be oriented so that the first ends 174 are directed toward the respective third and fourth sidewalls 130, 132 and the second ends 176 communicate with a central region 180 of the aftertreatment system 120. In particular, the first ends 174 may protrude or extend from the frame 166 so that a portion of the exterior of the sleeve 170 is exposed. To access the first and second SCR modules 160, 162, for example to retrieve and replace the plurality of SCR catalysts 164, one or more access panels 182 can be disposed in the respective third and fourth sidewalls 130, 132 positioned toward the modules. The central region 180 can direct the received exhaust gasses forward to the outlets 142 disposed through the front first wall 126. In various embodiments, one or more additional exhaust treatment devices can be disposed in the aftertreatment system 120 such as diesel particulate filters 184 for removing soot.

Referring to FIG. 3, to enable the tubular sleeves 170 to receive the plurality of SCR catalysts 164, the first end 174 of each sleeve can delineate an opening 178 through which the catalysts can be inserted. The sleeve 170 and the plurality of SCR catalysts 164 can have complementary circular or cylindrical shapes, although in other embodiments, other shapes are contemplated. To provide a clearance fit to enable insertion, the opening 178 can have a first width dimension, more specifically a sleeve diameter 179, that is equal to or slightly larger than a second cross-sectional dimension associated with the plurality of SCR catalyst 164 such as the catalyst diameter 168. The dimensions of the catalyst diameter 168 and the sleeve diameter 179 can be sized to provide a 2-3 millimeter gap, for example, between portions of the catalysts and the sleeve 170. Therefore, to prevent leakage of the exhaust gasses/reductant agent mixture between the plurality of SCR catalysts 164 and the sleeve 170, the two components can be adapted to form a sealing engagement with each other. For example, one or more circular ribs 169 can protrude radially about the circumference of each of the plurality of SCR catalysts 164 and form a seal or slight interference fit with the inner surface of the sleeves 170. Due to the complementary fit between the sleeve 170 and the plurality of SCR catalysts 164, the catalysts can be positioned into concentric alignment with the sleeve axis 172.

In an embodiment, the axial length of the sleeves 170 between the first end 174 and second end 176 can be sized to be generally coextensive with the combined length of the plurality of SCR catalysts 164. For example, in the illustrated embodiment, the sleeve 170 can receive a first catalyst 190, a second catalyst 192 and a third catalyst 194 that are arranged and axially inserted in the sleeve. The first catalyst 190 can be oriented toward the first end 174, the second catalyst 192 can be oriented toward the second end 176, and the third catalyst 194 can be disposed in between the first and second catalysts. Once inserted, the plurality of SCR catalysts 164 are arranged adjacent to each other in a stacked, abutting relationship and can be substantially coextensive with the length of the sleeve 170. To further seal the plurality of SCR catalysts 164 and the sleeve 170, one or more gaskets 196 can be disposed between adjacent catalysts and between the second catalyst 192 and the second end 176 of the sleeve. The gaskets may be thin metal crush gaskets or may be made from compressible elastomeric materials.

To confine the plurality of SCR catalysts 164 in the tubular sleeve 170, a first retention mechanism 200 and a second retention mechanism 202 can be included to engage the respective first end 174 and second end 176 of the sleeve. Although the disclosure describes the first and second retention mechanisms 200, 202 with respect to the first SCR module 160, it should be appreciated that similar retention mechanisms may be utilized with the second SCR module 162. When installed, the first and second retention mechanisms 200, 202 can constrain or prevent axially displacement of the plurality of SCR catalysts 164 with respect to the sleeve 170 thereby preventing unintentional removal of a catalyst from the sleeve. However, the first and second retention mechanisms 200, 202 can be configured to allow exhaust gasses to enter and exit the sleeves 170 while retaining the catalysts. For example, the first retention mechanism 200 may include a retention ring 210 that exhaust gasses can pass centrally through. The second retention mechanism 202 engaged to the downstream end 176 may be a bar, a grate, or the like traversing the downstream end while allowing communication of the exhaust gasses between the sleeve 170 and the central region 180. The second retention mechanism 202 may be permanently attached to the downstream end 176 by welding, brazing or the like. In contrast, the first retention mechanism 200 can be configured to repeatedly engage and disengage with the first end 174 to enable retrieval and replacement of the plurality of SCR catalysts 164.

To releasably secure the first retention member 200 to the sleeve 170, the first retention member can include one or more fasteners 250 that can be used to attach the retention ring 210 around or about the periphery of the first end 174 proximate the opening 178. Accordingly, the retention ring 210 can have a shape generally corresponding to the peripheral shape of the tubular sleeve 170. For example, referring to FIG. 4, in an embodiment, the retention ring 210 can have a band-like shape including an outer width dimension and an inner width dimension. In the illustrated embodiment, the outer width dimension can correspond to an outer diameter 214, and the inner width dimension can correspond to an inner diameter 216, although other embodiments of the retention ring 210 may have different shapes. The outer and inner diameters 214, 216 may define a thickness 218 there between. The outer diameter 214 and inner diameter 216 can be concentrically arranged with respect to a ring center 220. Although not shown, the retention ring can include support bars or the like extending in the opening delineated by the inner diameter. Moreover, the outer diameter 214 may generally correspond to or be slightly greater than the sleeve diameter 179 associated with the sleeve opening 178 and the inner diameter 216 may correspond to or be slightly less than the catalyst diameter 168 of the plurality of SCR catalysts 164. In those embodiments in which the tubular sleeve 170 is cylindrical, the retention ring 210 can be generally annular. However, in other embodiments with differently shaped sleeves and catalysts, the retention ring 210 may assume different corresponding shapes. The retention ring may be made from any suitable material including metals such as copper, steel, brass or aluminum.

To accommodate the fasteners, in an embodiment, the retention ring 210 can include a plurality of outwardly protruding tabs 222 disposed circumferentially around the outer diameter 214 of the ring. The number of tabs 222 can correspond to the number of fasteners used to secure the retention ring 210. The plurality of tabs 222 may be evenly spaced from one another about the circumference of the retention ring 210. Disposed or bored through each tab 222 can be circular tab bore 224 sized to produce a clearance fit with the respective fastener. Referring to FIGS. 4 and 5, the tab bore 224 can traverse the tab 222 from a first face 226 of the retention ring to a second face 228, indicated by the dashed lead line. In an alternative embodiment, the tabs 222 may be eliminated and the tab bores 224 can be disposed through the body of the retention ring 210 by, for example, increasing the outer diameter 214. In yet a further embodiment, the fasteners can be rotatably set or trapped in the tab bores 224 by, for example, a clip or the like so that they are part of the retention ring 210.

Referring to FIG. 5, the retention ring 210 may be shaped to facilitate its engagement with the sleeve. Specifically, the retention ring 210 may be have a cross-section shaped as a right angle having a first leg 230 delineating a forward plane that may correspond to the first face 226 of the ring and a second leg 232 depending rearward from the first leg and to approximately the second face 228. The tab 222 may protrude from the depending second leg 232. Further, the inner edge of the first leg 230 may further correspond to the inner diameter 216 and the intersection of the second leg 232 and the tab 222 may correspond to the outer diameter 214. The right-angled shape of the retention ring can be formed by pressing a blank between appropriate dies in a press.

Figure 6:
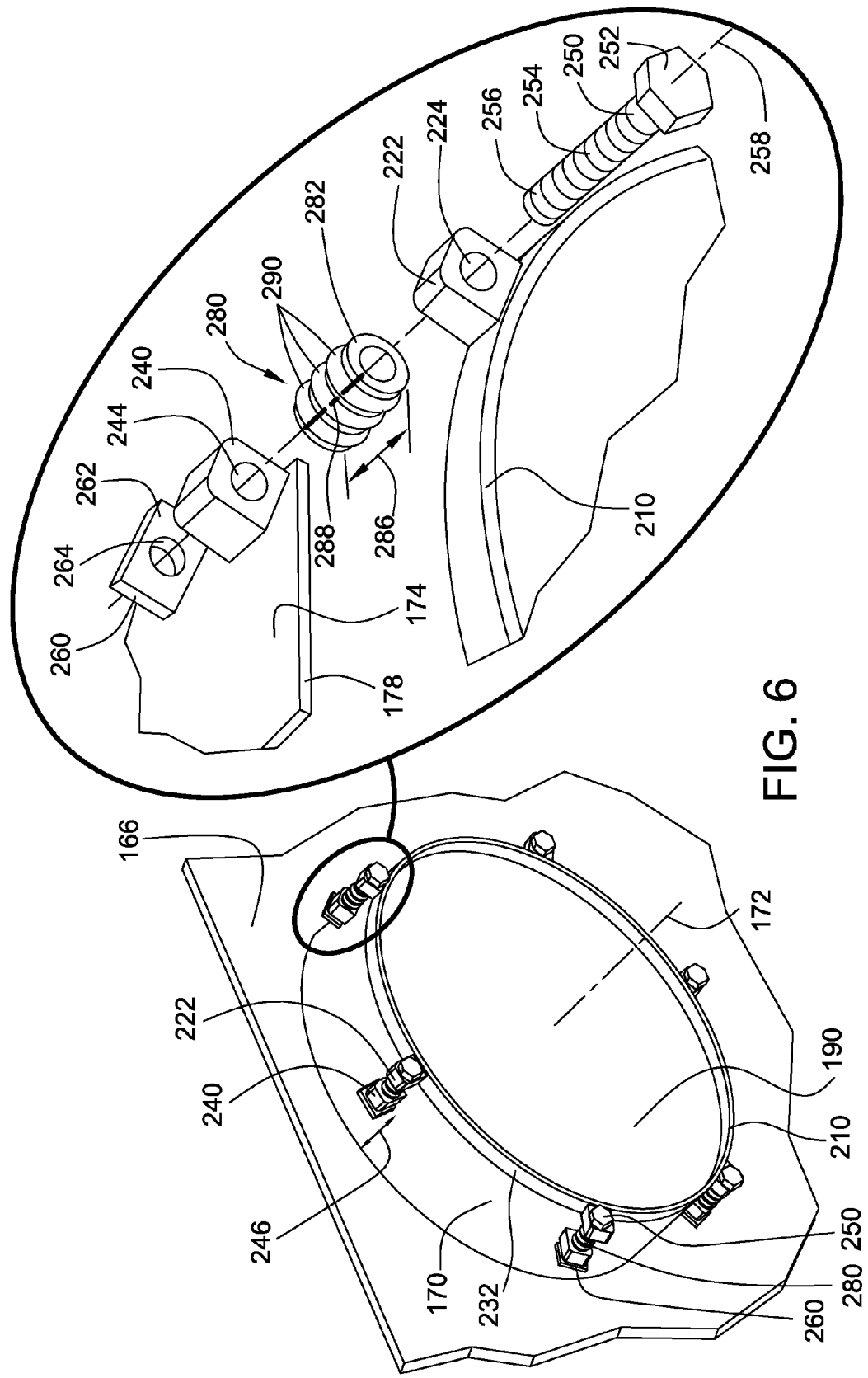
FIG. 6 is a perspective view of the sleeve and retaining ring engaged together by a combination of parts including a fastener, a compression body and a nut illustrated in detail.

Referring to FIGS. 3 and 6, to engage the retention ring 210 with the sleeve 170 after the plurality of SCR catalysts 164 have been inserted, the ring center 220 is aligned with the axis line 172 and the second face 228 of the ring is placed adjacent to the first end 174. Accordingly, the retention ring is disposed peripherally about the opening 178 in the sleeve 170. Further, the retention ring 210, the sleeve 170 and the plurality of SCR catalysts 164 may be concentrically aligned with each other via the sleeve axis 172. Because of the corresponding dimensions between the inner and outer diameters 214, 216 of the retention ring 210, the sleeve diameter 179, and the catalyst diameter 168, the retention ring can be superimposed over and in abutting contact with the first end 174 and the outer periphery of the first catalyst 190 as indicated in FIG. 6. In those embodiments in which the retaining ring 210 has a right-angled cross-section, the second leg 232 can extend around the outer periphery of the first end 174 of the sleeve 170 to hold the ring in alignment. In this embodiment, the retention ring functions similarly to a cap. In other embodiments, retaining ring 210 may include grooves or counterbores disposed in the second face 228 into which the peripheral edge of the first end 174 can be inserted to assist in properly aligning the ring to the sleeve axis 172.

To physically secure the retention ring 210 to the sleeve 170 via the fasteners 250, the sleeve may include one or more radially projecting bosses 240 disposed about the exterior of the first end 174 that protrudes from the frame 166 of the first SCR module. The bosses 240 may be evenly spaced about the circumference of the first end 174 with respect to the sleeve axis 172 and may correspond in position with the tabs 222 on the retention ring 210. The bosses 240 may be made of metal and can be attached to the first end 174 by welding, brazing or another suitable attachment method. For clearance and access purposes, the bosses 240 may be spaced apart from the frame 166 by a distance 246, indicated in FIG. 6 by the arrow. Disposed through each of the bosses 240 can be a boss aperture 244 sized for a clearance fit with the fastener 250. The fastener 250, in an embodiment, can be an elongated, threaded bolt although in other embodiments, other types of fasteners can be used. The fastener 250 can include a bolt head 252 having an elongated rod 254 extending therefrom with a threaded end 256 distally positioned from the bolt head. The elongated rod 254 of the fastener 250 thereby defines a fastener axis 258 indicating the direction of application. In various embodiments, the bolt head 252 may be a hex head adapted to engage a socket driver or the bolt head may have one or more slots disposed in it to engage a screwdriver.

To threadably mate with the fastener 250, the first retention mechanism 200 can include a nut 260 and more specifically, for example, a plate nut including a flat plate 262 with a centrally disposed threaded aperture 264. The plate nut 260 can be produced as a stamped plate of metal that the threaded aperture is drawn through. Although the illustrated nut 260 includes a square, flat plate 262 for a body, in other embodiments, any other suitable type of nut may be used including hex nuts, acorn nuts and the like. The nut 260 can be placed adjacent the boss 240 protruding from the sleeve 170 on the opposite side that is oriented toward the tab 222 protruding from the retention ring 210. The tab 222, the boss 240, and the nut 260 may be thus arranged so that the tab bore 224, the boss aperture 244, and the threaded aperture 264 are aligned. Accordingly, the fastener axis 258 can be also be aligned with the bores and apertures and the fastener 250 can be directed through the tab bore 224 and the boss aperture 244 to mate with the nut 260. In other embodiments, rather than including a boss disposed on the sleeve and a separate nut, the fastener 250 may thread directly into a correspond aperture disposed in the fame 166 of the first SCR module 160.

Referring to FIGS. 3 and 6, in a further embodiment, the first retention mechanism 200 can include an additional component in the form of a compression body 280. The compression body 280 can include a unitary tubular sleeve 282 having a longitudinal bore 284 disposed through it. The longitudinal bore 284 can thereby delineate a longitudinal axis 288, indicted by the heavier centerline. Moreover, the longitudinal bore 284 can be sized and shaped to clearly receive the elongated fastener 250 when the compression body 280 and the longitudinal axis 288 are properly aligned with the fastener axis 258. The compression body 280 can have an initial longitudinal dimension 286, indicated in FIG. 6 by the arrow. When used with the first retention mechanism 200, the compression body 280 may be disposed between the tab 222 projecting from the retention ring 210 and the boss 240 on the first end 174.

Formed in the compression body 280 can be a plurality of adjacent beads 290 arranged longitudinally and aligned along the longitudinal axis 288. The rounded beads 290 may provide the compression body 280 with a buckled or corrugated surface. To form the beads 290, the tubular sleeve 282 may be initially cylindrical and maybe cold worked into the beaded shape by a turning operation. If the compression body 280 is placed under an axially compressive force asserted, for example, between the tab 222 and the boss 240, the adjacent beads 290 can begin to collapse together with respect to the longitudinal axis 288, similarly to the collapsing of a bellows. Accordingly, the tubular body 282 may begin to crush or collapse with respect to its initial longitudinal dimension 286 to a shorter dimension. In return, the collapsing beads 290 may provide a resistive force or counter compressive force in the direction of the longitudinal axis 288.

When the compression body 280 is compressed between the tab 222 and the boss 240, this force may be applied to the other components of the first retention mechanism such as the fastener 250 and the nut 260, preloading these components and preventing them from unintentionally loosening with respect to each other. Additionally, the counterforce may cause the retention ring 210 and the first end 174 to urge against each other holding those components in rigid alignment. The number of adjacent beads 290 and the size of the beads can be varied to provide for different ranges of collapse (i.e. different changes in the initial longitudinal dimension 286) and different degrees of counterforce. The compression body 280 may therefore act or function as a spring or tensioning mechanism. To enable the compression body 280 to collapse, the tubular sleeve 282 can be made from a relatively more pliable or yieldable grade of material than the other components of the first retention mechanism 200, such as a lower grade of stainless steel. In other embodiments, other devices like springs may be used to provide the counterforce.

Figure 7:
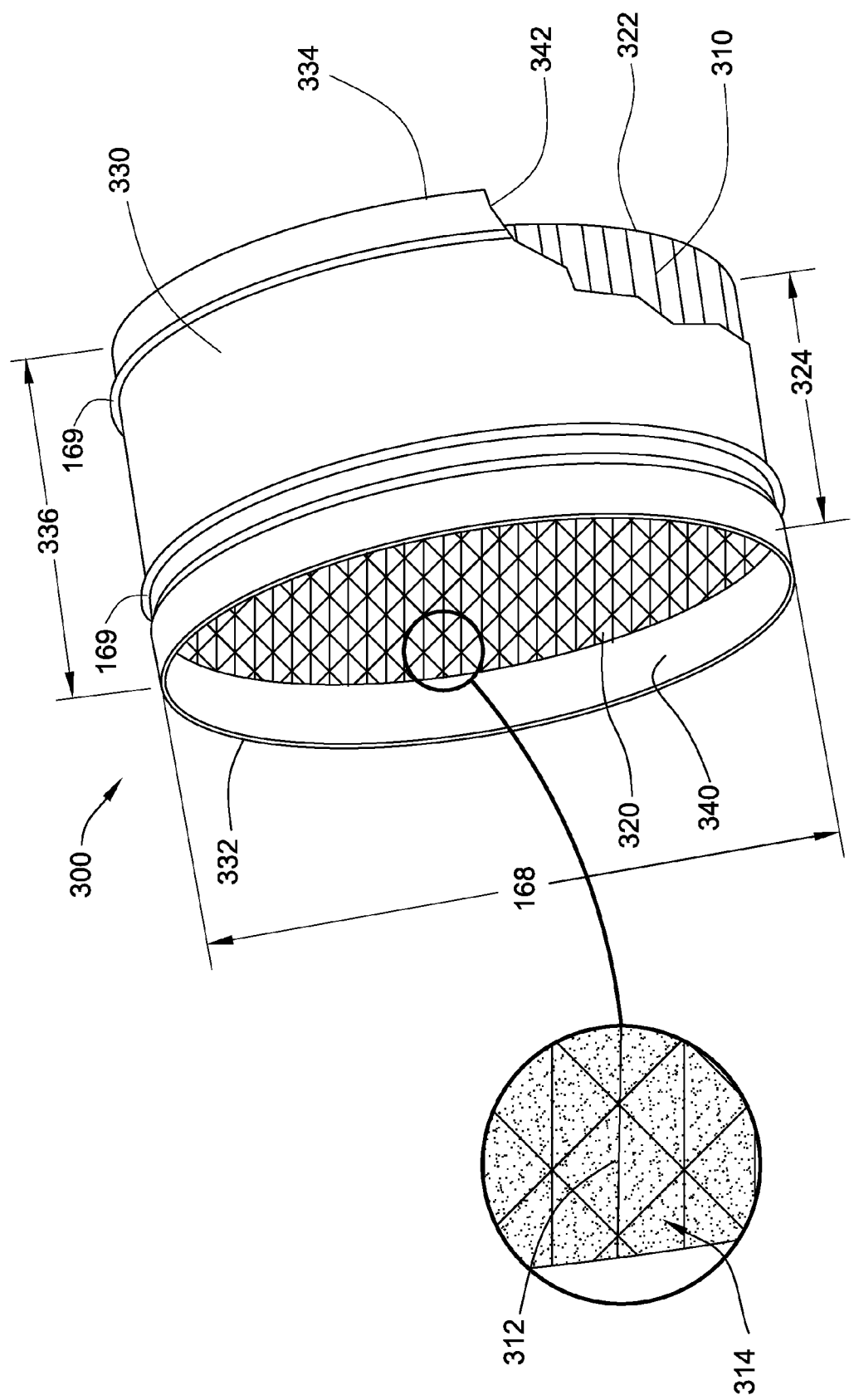
FIG. 7 is a perspective view of an embodiment of an aftertreatment brick, in particular a selective catalytic reduction catalyst, having a mantle disposed around a substrate matrix with the substrate matrix illustrated in detail.

As stated elsewhere, the disclosure may applied to retaining any suitable type of aftertreatment brick in an aftertreatment system. Referring to FIG. 7, for example, there is illustrated an embodiment of a suitable aftertreatment brick and, specifically, a SCR catalyst 300 that can perform an SCR reaction. To support the catalytic material that performs the chemical reaction, the SCR catalyst 300 can include an internal substrate matrix 310 made of a triangular lattice, honeycomb lattice, metal mesh substrate, or similar thin-walled support structure 312 onto which the catalytic material or catalytic coating 314 can be disposed. Such designs for the support structures enable the exhaust gas/reductant agent mixture to pass into and through the SCR catalyst 300. Any suitable material can be used for the support structure 312 including, for example, ceramics, titanium oxide, or copper zeolite. Catalytic coatings 314 that initiate the SCR reaction can include various types of metals such as vanadium, molybdenum and tungsten. The catalytic coating 314 can be deposited on the support structure 312 by any suitable method including, for example, chemical vapor deposition, adsorption, powder coating, spraying, etc. In other embodiments, instead of having separate support structures and catalytic coatings that are often employed together to reduce material costs, the substrate matrix can be made entirely from a catalytic material. In the illustrated embodiment, the substrate matrix 310 has a generally cylindrical shape and extends between a first circular face 320 and a second circular face 322 to delineate a first length 324, however, in other embodiments, different shapes can be applied to the substrate matrix, e.g., square, rectangular, etc. By way of example only, the first length may be about seven (7) inches.

To protect the support structure 312, a tubular mantle 330 can be generally disposed around the substrate matrix 310. The tubular mantle 330 can be made of a thicker or more rigid material than the thin-walled support structure 312, such as aluminum or steel. For example, the mantle may be about 5/16 of an inch thick to provide sufficient structural rigidity to the catalyst. The outer circumference of the mantle 330 may correspond to the catalyst diameter 168 sized for accommodation in the sleeves. Dispose around the exterior of the mantle 330 can be the protruding ribs 169 that can contact the inner wall of the sleeve. The tubular mantle 330 can have a shape complementary to that of the substrate matrix 310 which, in the illustrated embodiment, is generally cylindrical. The cylindrical mantle 330 can therefore extend between a first circular rim 332 and a second circular rim 334, whose diameter also corresponds to the catalyst diameter 168. However, in other embodiments the mantle and its first and second rims can have other shapes. The mantle can have a second length 336 delineated between the first rim 332 and the second rim 334 that is slightly larger than the first length 324 of the substrate matrix 310. By way of example only, the second length 336 may be approximately eight (8) inches.

Accordingly, when disposed around the shorter substrate matrix 310, the mantle 330 can have an overhanging extension or lip 340 protruding beyond at least the first face 320 of the substrate matrix. The lip 340 therefore extends the first rim 332 a short distance beyond the first face 320. In those embodiments in which the shorter substrate matrix 310 is centered at a mid-length position with respect to the longer mantle 330, a second lip 342 may protrude beyond the second face 322 of the matrix and extend the second rim 334 from the second face. For the examples given above, with the length of the substrate matrix 310 being 7 inches and the length of the mantle being 8 inches, the first and second lips 340, 342 may be on the order of one-half inch (½) inch. Accordingly, the first and second faces 320, 322 of the thin-walled substrate matrix 310 are set back one-half inch into the outer protective mantle 330.

INDUSTRIAL APPLICABILITY

As stated above, the present disclosure is directed to accommodating and retaining one or more aftertreatment bricks in an aftertreatment system such as the large exhaust aftertreatment system 120 or CEM illustrated in FIG. 1. In particular, the described retention mechanism and method is particularly useful when retaining a plurality of aftertreatment bricks in the system, facilitates removal and replacement of depleted aftertreatment bricks from the system, and may provide several other possible benefits and advantages. According to the disclosure and with reference to FIG. 3, a plurality of SCR catalysts 164 or other types of aftertreatment bricks may be inserted into a correspondingly shaped, elongated sleeve 170 included as part of an SCR module. Specifically, the plurality of SCR catalysts 164 are axially inserted through an opening 178 disposed in the first end 174 of the sleeve 170 such that a first catalyst is proximate the first end and a second catalyst is proximate the opposite second end 176. A sliding fit between the catalysts and the sleeve may concentrically align the catalysts along a sleeve axis 172.

Figure 8:
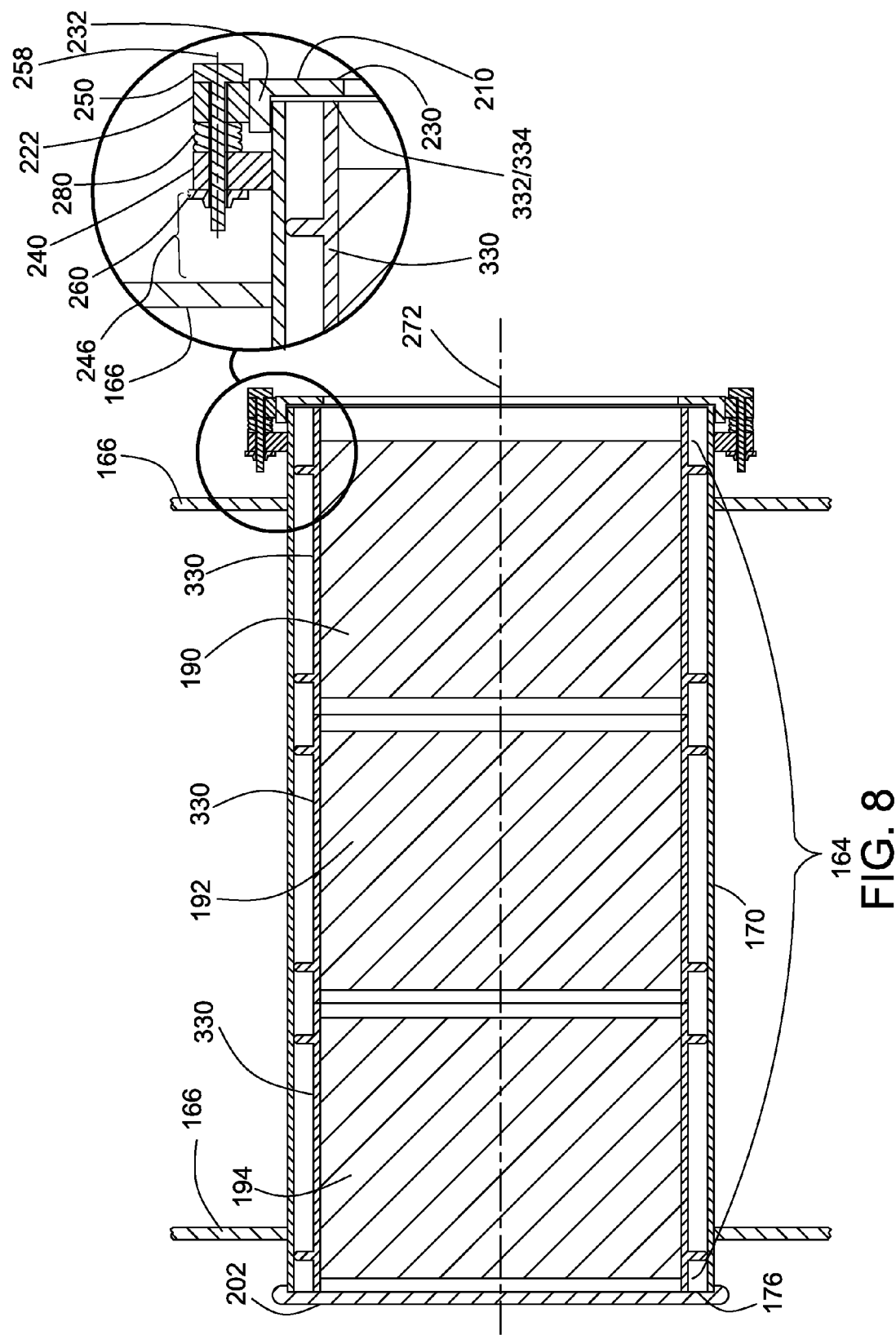
FIG. 8 is a cross-sectional view illustrating the plurality of aftertreatment bricks retained in the sleeve by the retention ring and a cross section of the combination of parts engaging the sleeve and ring together illustrated in detail.

To prevent the plurality of catalysts 164 from unintentionally exiting the sleeve 170, a retention ring 210 that is part of a first retention mechanism 200 is placed adjacent to the opening 178 and may be sized to circumscribe the periphery of the first end 174. In the embodiment illustrated in FIG. 8, the retention ring 210 may be formed as an annular, right-angled shoulder including a first leg 230 and a second leg 232 to receptively engage the first end 174 to center the ring with respect to the sleeve axis 172. Referring to FIGS. 5 and 8, when adjacent the opening 178, portions of the retention ring may be superimposed over and contact or abut both the first end 174 of the sleeve and the outer periphery of the first catalyst 190. In particular, the planar first leg 230 of the retention ring 210 may abut the axially directed edges of the first catalyst 190 and of the first end 174 of the sleeve 170 while the second leg 232 extends around the exterior of the first end. In other embodiments, the outermost peripheral edge of the retention ring may be flush with the exterior of the first end or it may be set radially inward with respect to the first end. In those embodiments wherein the combined length of the plurality of SCR catalysts 164 is equal to the length of the sleeve 170, it can be appreciated from FIG. 8 that displacement or axial movement of the catalysts with respect to the sleeve axis 172 is constrained between the retention ring 210 and the second retention mechanism 202.

To releasably secure the retention ring 210 around the periphery of the first end 174, the first retention mechanism 200 can include additional components configured to engage and disengage each other. Referring to FIGS. 6 and 8, those components can include a plurality of threaded fasteners 250 and a mating nut 260 that can be arranged to clamp the retention ring 210 and sleeve 170 together. More specifically, the tabs 222 on the retention ring 210 can be aligned with the bosses 240 on the sleeve 170 so that the fasteners 250 can be directed through each of the tab bores 224 and boss apertures 244. The nut 260 may be positioned on the opposite side of the boss to mate with the fastener 250. The retention ring 210 is thereby clamped to the sleeve 170 via the mated fastener 250 and nut 260. The clearance provided by the distance 246 the boss 240 is spaced from the frame 166 facilitates placement of the nut. Because the fastener-and-nut joints are evenly space circumferentially around the retention ring 210 and the first end 174, the axial retention force is applied evenly around the circumferential periphery of the catalysts. Moreover, because the fastener axis 258 is substantially parallel to the sleeve axis 172, axial forces arising from the abutting catalysts can be transferred through the fasteners 250 to the sleeve 170 where the forces may dissipate.

If the plurality of SCR catalysts 164 includes protective outer mantles 330 with extended first and second rims 332, 334, as described above, the retention ring 210 will abut against the one of the rims. Accordingly, a rigid, metal-to-metal contact may be made between the sleeve 170, the plurality of catalysts 164, and retention ring 210 thereby protecting what may be the relatively weaker substrate matrices. Further, the adjacent catalysts can be concentrically aligned to abut each other at the rims so that axial forces are transferred through the rigid mantles rather than the relatively weaker substrates.

Tightening of the fastener 250 and nut 260 can also compress the pliable compression body 280 positioned between the tab 222 and the boss 240. Further, because each compression body 280 among the plurality may independently compress to different degrees of deformation, the circumferential arrangement of compression bodies around the retention ring 210 can account for varying tolerance in stack-ups arising from the abutting plurality of SCR catalysts 164. Further, the compression bodies 280 can accommodate misalignment or disorientation between adjacent catalysts due to manufacturing discrepancies or improper insertion into sleeves. The spring forces exerted by the compression bodies 280 may also accommodate thermal expansion and contraction of the plurality of SCR catalysts 164 and other clamping assembly components due to the heated exhaust gasses directed through or around them. The compression bodies 280 may also account for creep or set between the components overtime.

Referring to FIGS. 6 and 8, to remove the fasteners 250 to, for example, remove and replace a depleted catalyst, the fasteners can be unfastened from the nuts 260 and the retention ring 210 disengaged from the first end 174. However, due to the operating conditions of the aftertreatment module, including hot exhaust gasses and possibly corrosive reductant agent, the metal components may undergo a galling process over time in which the adjacent surfaces of the components adhere at a microscopic level and materials transfer or join between the components. Another possibility is that possibly corrosive compositions in the exhaust gasses and/or reductant agent may corrode the components of the clamping assembly together. In such instances, it may be necessary to sever the fastener 250 and/or nut 260 to remove the retention ring 210 and access the catalysts. Severing the fastener and/or nut may be accomplished by cutters, saws, grinders, torches, and the like.

Because severing components like the fastener 250 and/or the nut 260 prevents their reuse, another aspect of the disclosure provides a kit of replacement parts for use in servicing an aftertreatment module. The kit may include components that may become damaged during replacement of the catalysts, such as the fastener 250, nut 260 and, in embodiments, the compression body 280. Referring to FIG. 3, the kit might also include other components used in servicing the aftertreatment system like the gaskets 196 that may be intended for single use applications. The retention ring 210, although it may be sturdy enough for reuse, may also be included in the kit. If necessary, replacement bosses 240 may also be provided for reattachment to the first end 174 of the sleeve 170. Hence, the kit facilitates the servicing and replacement of catalysts in the aftertreatment module.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An aftertreatment module comprising:
   at least one sleeve extending between a first end and an opposing second end along a sleeve axis, the at least one sleeve including an opening at the first end;
   one or more aftertreatment bricks inserted in the at least one sleeve, each of the aftertreatment bricks including a substrate matrix and a mantle disposed around the substrate matrix;
   a retention ring having a first width dimension less than a second width dimension associated with the opening of the sleeve, the retention ring releasably engaged to the sleeve and in abutting contact with the mantle, the retention ring having a first leg shaped to superimpose over and abut the first end of the sleeve, a second leg depending from the first leg and being shaped to extend around an outer circumference of the first end of the sleeve, wherein an inner edge of the first leg corresponds to the first width dimension;
   wherein the aftertreatment brick is concentrically accommodated in the sleeve, and the retention ring is concentrically aligned with the aftertreatment brick; and
   wherein the substrate matrix has a cylindrical shape and extends between a first face and a second face, and the mantle is tubular and extends between a first rim and a second rim, the first and second rims associated with an aftertreatment brick diameter, the first rim and the second rim extending beyond the first face and the second face relatively.

2. The aftertreatment module of claim 1, wherein the retention ring is generally annular, wherein the first width dimension corresponds to an inner diameter that is less than the aftertreatment brick diameter.

3. The aftertreatment module of claim 1, wherein the retention ring is releasably engaged to the sleeve by a plurality of fasteners and a plurality of nuts threadably mating together.

4. The aftertreatment module of claim 3, wherein the retention ring includes a plurality of outwardly protruding tabs disposed about the second leg of the retention ring, the tab defining a bore to accommodate a fastener.

5. The aftertreatment module of claim 4, wherein the sleeve includes a plurality of bosses disposed exteriorly about the first end, each of the plurality of bosses delineating an aperture for receiving the fastener.

6. The aftertreatment module of claim 5, further comprising a compression body delineating a bore for receiving the fastener, the compression body configured to longitudinally collapse with respect to an axis of the fastener.

7. The aftertreatment module of claim 6, wherein the compression body includes a plurality of beads arranged longitudinally with respect to the bore.

* * * * *